United States Patent [19]

Grepiotis et al.

[11] 4,220,048
[45] Sep. 2, 1980

[54] COOLER AND LEVEL INDICATOR FOR BEER KEGS

[76] Inventors: John A. Grepiotis; Joseph A. Grepiotis, both of 3981 Frandon Ct., Simi Valley, Calif. 93063

[21] Appl. No.: 48,806

[22] Filed: Jun. 15, 1979

[51] Int. Cl.³ .................... G01F 23/02; G01F 23/06
[52] U.S. Cl. .................................. 73/323; 73/322; 62/125
[58] Field of Search ............... 73/323, 328, 305, 317, 73/322.5, 322; 222/146 C, 155; 62/125, 127, 129, 131

[56] References Cited

U.S. PATENT DOCUMENTS

| | | | |
|---|---|---|---|
| 2,792,692 | 5/1957 | Bryan | 222/146 C |
| 3,212,335 | 10/1965 | Guiffre | 73/328 |
| 3,311,267 | 3/1967 | Lee et al. | 73/323 X |
| 3,956,934 | 5/1976 | White | 73/323 |

Primary Examiner—Daniel M. Yasich
Assistant Examiner—Joseph W. Roskos

[57] ABSTRACT

A cooler and level indicator for beer kegs comprising an insulated container for holding iced water in contact with a keg of beer, an insulated cover for sealing the container and an externally readable level gauge for indicating the iced water level, said level being proportional to the amount of beer remaining in the keg after the keg becomes buoyant.

5 Claims, 3 Drawing Figures

COOLER AND LEVEL INDICATOR FOR BEER KEGS

BACKGROUND OF THE INVENTION

The present invention relates to a system for the cooling of beer kegs and for indicating the amount of beer remaining. It is current practice in the dispensing of beer by noncommercial users to connect a dispensing pump to the keg and then to place it in a tub of ice. Because the keg is only partially immersed, cooling of its contents comes about largely by means of natural convection currents. On hot days the ice is added to frequently. As the keg is emptied, it begins to float on the iced water so that less and less of its surface is immersed. The area exposed to warm air increases so that cooling efficiency of the arrangement is continually reduced. As a result of these factors the beer dispensed as the keg empties contains increasing amounts of foam. It also becomes difficult to judge when the keg should be replaced.

An object of this invention is to provide a simple means for the efficient cooling of a keg of beer. It is another object of the invention to obtain a more complete cooling over long periods of time regardless of the degree of immersion of the keg. It is a further object of the invention to provide an indicating means for allowing the amount of beer remaining in the keg to be more accurately estimable.

DESCRIPTION OF THE INVENTION

The present invention makes use of an insulated housing as a container for iced water and the keg. The insulation shields the keg and water from outside sources of heat. A visual indicator of the iced water level provides a measure of the amount of beer remaining as the key begins to float.

The operation of the invention will be described with reference to FIGS. 1 and 2.

Figure 1:
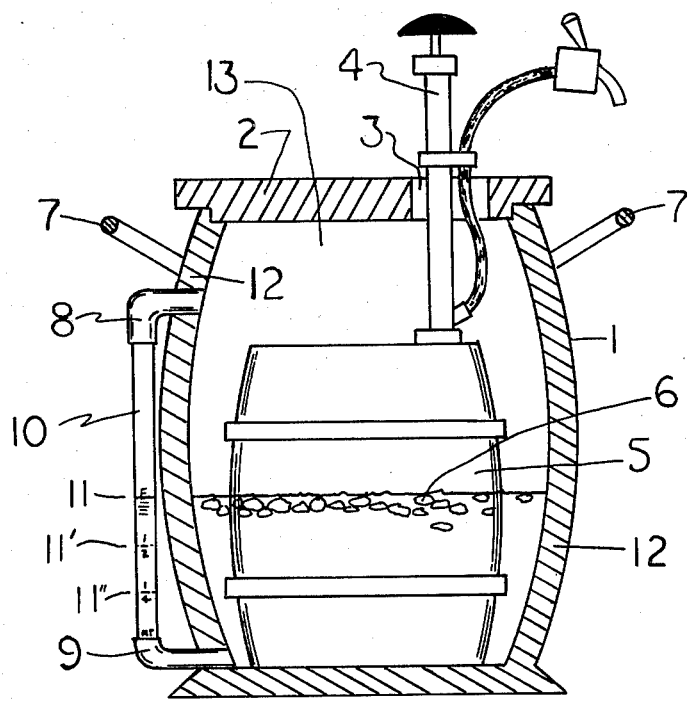
FIG. 1 is a cross section of the invention.
Figure 2:
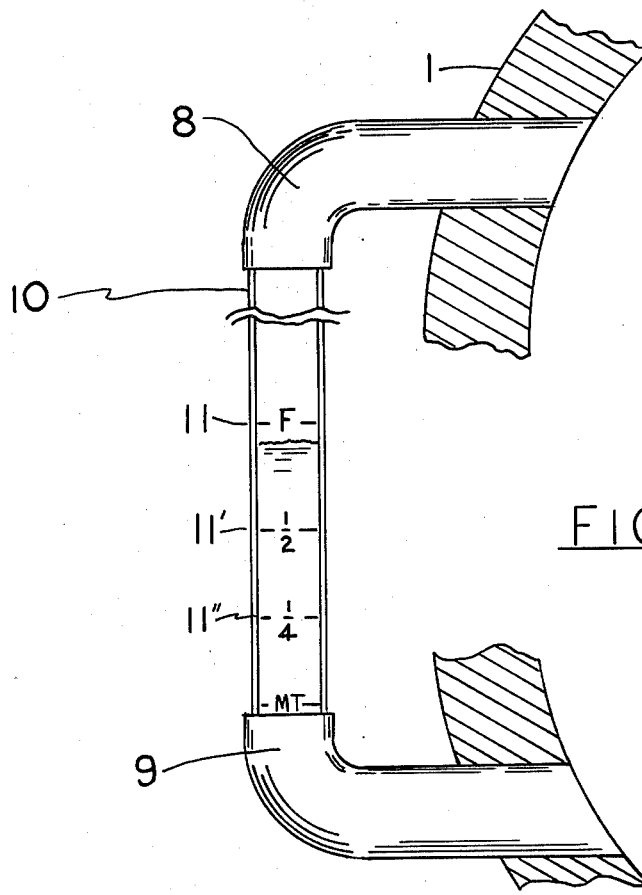
FIG. 2 is an enlarged view of the indicating means shown in FIG. 1.

With reference now to FIG. 1 the invention includes the thermally insulating container 1 closed at its top by the thermally insulating cover 2. An opening 3 in the cover accommodates the dispensing pump 4. The container 1 is sized internally to hold a beer keg 5 and a quantity 6 of crushed ice and water. A U shaped indicator assembly comprised of the tubing elbows 8 and 9 and the transparent tube 10 penetrates the insulation 12 at the upper and lower levels and is in hydraulic communication with the interior of container 1. The transparent tube 10 is marked with level lines 11,11' and 11" as is shown in the figures.

Handgrips 7 are attached to the container 1 to facilitate handling.

In operation, the keg is first placed within the container and the dispensing pump is attached. A mixture of crushed ice and water is added to the container until the level 11 is reached. This adjusts the indicator to the starting position F. The cover 2 is then placed over the container with the shaft of the dispensing pump fitting through the opening 3. As the ice melts, it removes heat from the keg and chills the beer. The thermal insulation 12 inhibits heat addition from the outside so that the inner surfaces of the container and the air space 13 approach the temperature of the melting ice mixture. As a result, the temperature throughout the interior of the container tends to reach a uniform value and the chilling effectiveness of the iced water continues over a relatively long period.

As the beer is pumped out of the keg, a point is reached where the displacement force of the iced water mixture exceeds the weight of the keg and its remaining contents. The keg begins to float and thus decreases its displacement. The water level, as seen in the transparent tube, begins to drop. The emptying of the keg can thus be followed externally.

A specific container is adapted for a particular standard size of beer keg and the calibration marks are empirically determined for that size.

A number of materials can be used in the construction of the invention. The insulation in the walls of the container and in the cover may be of a foamed plastic such as polystyrene. The insulation may be encased within a sheet plastic such as polypropylene in order to provide increased structural rigidity. Other commonly used insulating constructions and materials may also be used.

Figure 3:
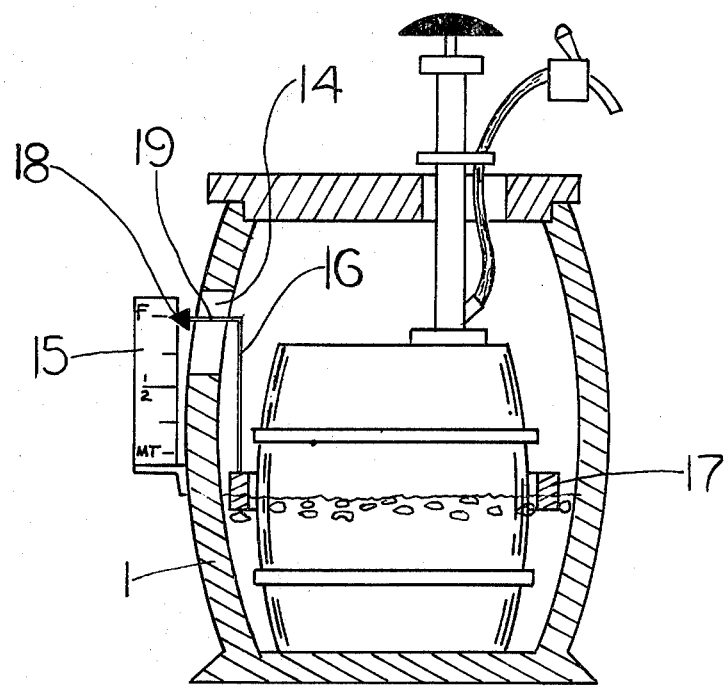
FIG. 3 is cross section of a second embodiment of the invention.

The transparent tube 10 is preferably of thick walled plexiglass and is joined by cementing to plastic tubing elbows. An alternative method for level indication would include a float resting on the iced water and joined by mechanical linkage to an externally located dial. This embodiment is shown in FIG. 3. A float 17 rests on and moves with the level of the water. A rod 16 is firmly fixed at one end to float 17, is bent into a horizontal position 19, and terminates in the arrow 18. The horizontal portion of the rod passes through the slit 14 cut into container 1. A calibrated scale 15 is mounted externally and permits the position of arrow 18 to be read in terms of keg contents. These and other variations are possible without departing from the spirit of the invention which is described in the appended claims.

We claim:

1. An apparatus for the chilling and gauging of beer kegs comprising:
   a. a thermally insulated container of sufficient size to hold a keg of beer and a quantity of iced water;
   b. a thermally insulated and perforated cover for said container;
   c. level detecting means for measuring the height of said iced water when the keg is in place in said insulated container along with a measured amount of said iced water;

whereby the chilling time of the iced water is extended as a result of the isolating effect of the insulation and the quantity of beer in the keg can be inferred from said level detecting means.

2. An apparatus for the chilling and gauging of beer kegs as set forth in claim 1 in which said level detecting means is comprised of a U shaped, vertically oriented transparent tube assembly which is sealed into and in hydraulic communication with the top and bottom interior spaces of said container whereby the level of said iced water inside the transparent tube will be the same as that in said chamber.

3. An apparatus for the chilling an gauging of beer kegs as set forth in claim 2 in which said level detecting means will indicate a drop in iced water level as the beer keg is emptied sufficiently to produce flotation of the keg and decreased displacement of the iced water.

4. An apparatus for the chilling and gauging of beer kegs as set forth in claim 3 in which said drop in water level can be read on the level indicating means using calibrated markings previously determined to correspond to known levels of beer in the beer keg.

5. An apparatus for the chilling and gauging of beer kegs as set forth in claim 1 in which said level indicating means is comprised of a float resting on the surface of said iced water and coupled to an external dial.

* * * * *